Sept. 29, 1925.
E. B. TUPPEN
1,555,724
CLUTCH AND POWER STOP MECHANISM
Filed Jan. 25, 1924
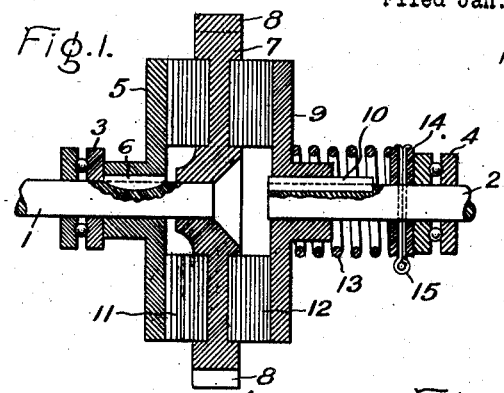
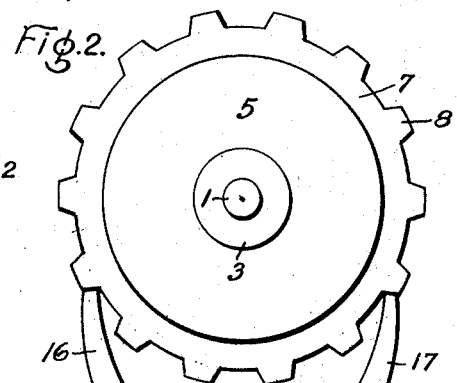
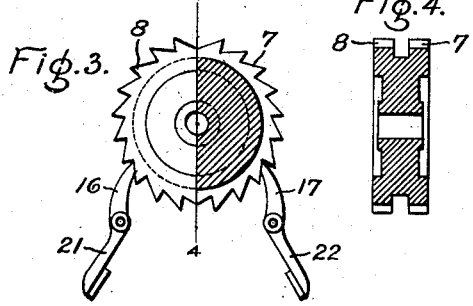
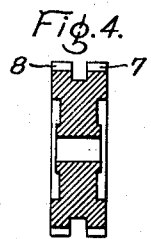
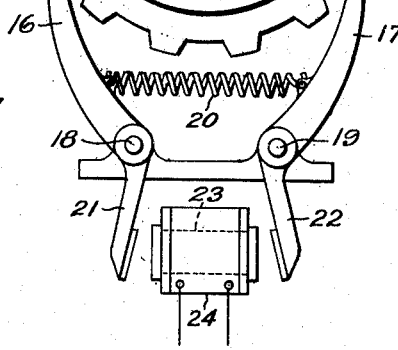
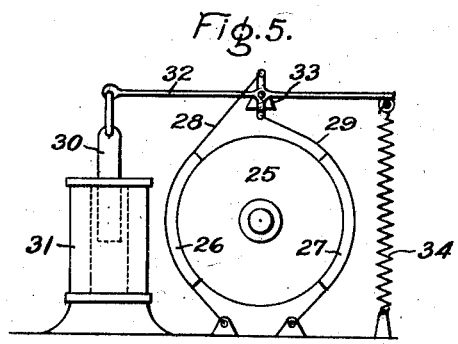
Inventor:
Edward Browne Tuppen,
by *[signature]*
His Attorney.

Patented Sept. 29, 1925.

1,555,724

UNITED STATES PATENT OFFICE.

EDWARD BROWNE TUPPEN, OF RUGBY, ENGLAND, ASSIGNOR TO GENERAL ELECTRIC COMPANY, A CORPORATION OF NEW YORK.

CLUTCH AND POWER STOP MECHANISM.

Application filed January 25, 1924. Serial No. 688,561.

*To all whom it may concern:*

Be it known that I, EDWARD BROWNE TUPPEN, a subject of the British Empire, residing at Rugby, in the county of Warwick, England, have invented certain new and useful Improvements in Clutch and Power Stop Mechanisms, of which the following is a specification.

This invention relates to clutch and power stop mechanisms and more particularly to those of the frictional type.

It is often found necessary, in various forms of mechanism, to stop a driven member in a very short interval of time in order that the member may be in a definite position for performing a certain operation. For example, in systems of motor control in which a motor-operated cam shaft is employed to close a series of contactors in a definite sequence, it is necessary to provide some means whereby the rotation of the cam shaft may be stopped at very definite angular positions. For reasons of economy both in space and cost, it may be desirable to employ a small and comparatively high speed motor, which renders it rather difficult to bring the cam shaft to rest at definite positions, particularly if the motor is so coupled to the cam shaft that the one cannot rotate without the other.

The pilot or driving motor usually runs at a higher speed than the cam shaft and it is usual to apply retarding means to a relatively high speed moving part such as the motor shaft or worm shaft, in order to prevent an undue torque, which might occur if the retarding means were applied to a relatively slow-speed part, such as the cam shaft. If the retarding force is applied to the motor shaft, the torque to be overcome is relatively small while the speed is relatively high, and in order to bring the motor to rest in a fraction of a revolution, or even in a few revolutions, it is necessary to employ a brake, which may be of the ordinary band or disc type or the braking effect may be obtained dynamically, but in any case the motor must be brought to rest very quickly. This condition is not easily satisfied in practice for various reasons such as varying speed of motor due to varying voltage, the wear of the clutch and varying conditions of the clutch surfaces.

The employment of a high-speed motor having suitable reducing gear to drive the cam shaft at a comparatively low speed results in the storage of a comparatively large amount of energy in the motor armature, while the worm shaft, which is driven by the motor and may run at the same speed, is usually of much smaller diameter than the motor armature and consequently stores a comparatively small amount of energy.

The object of the present invention is to provide simple, inexpensive and reliable means whereby a shaft driven by a motor or any driving member may be stopped at relatively definite angular positions without the necessity of the motor being stopped at the same relative positions, and to that end it consists in inserting, between the driving and driven member, a frictional clutch, an intermediate member of which can be stopped by means of a brake or clutch. The frictional clutch may comprise disc members mounted on the driving and driven members, together with the intermediate member which frictionally engages the disc members. Means are provided for enabling the parts most subject to wear to be readily replaced, without removing any other parts and without the necessity of readjustment of any kind.

The invention will be better understood with reference to the acompanying drawing, which illustrates one method of carrying the invention into effect as applied by way of example to a motor-operated cam shaft.

In the drawing, Fig. 1 is a sectional view of the frictional clutch; Fig. 2 is an end view of the clutch shown in Fig. 1, together with pawl operating mechanism for stopping the intermediate member; Fig. 3 shows an alternative shape of the teeth engaged by the pawl operating mechanism illustrated in Fig. 2; Fig. 4 is a sectional view on the line 4—4 of Fig. 3, and Fig. 5 is a view of a hand-brake mechanism which may be used as an alternative to the pawl operating mechanism.

Referring to Figs. 1 and 2, a driving shaft 1 and a driven shaft 2 respectively carry ball thrust washers 3, 4. A disc 5 is fixed to the shaft 1 by a key 6, and a disc 7 is mounted so as to be free to rotate on the shaft 1. The disc 7 is provided with teeth 8 on its outer circumference. Mounted on, and rotating with, the shaft 2 is a disc 9, which is free to slide axially on a feather key 10. Two discs 11, 12, preferably constituted of wear-resisting material, are supported in annular recesses in the disc 7. In order to keep the discs 5, 11, 7, 12 and 9 in contact, a spring 13 under initial compression is adapted to bear on the disc 9. A collar 14 is secured to the shaft 2 by means of a pin 15 and forms the other bearing for the spring 13.

Two pawls 16, 17, pivoted at 18, 19 respectively, are adapted to engage the teeth 8, and are pulled into engagement by a spring 20. Extensions 21, 22 on the pawls 16, 17 respectively are attracted by a solenoid core 23 when the solenoid 24 is energized. The teeth 8, instead of having the form shown in Fig. 2, may be of the form shown in Figs. 3 and 4, with pawls shaped accordingly. In this case, two sets of teeth shaped in opposite directions are provided, and a pawl is suitably formed for engaging the respective set of teeth, according to the direction of rotation.

The operation of the device is as follows:

When the shaft 1 is rotated, it is obvious that, due to the friction between the discs 5, 11, 7, 12, and 9, the shaft 2 will rotate, as the pressure exerted axially by the spring 13 will be so chosen that the torque required to give relative movement between the discs 5 and 9 will exceed the maximum torque of the motor driving the shaft 1. Under normal running conditions the solenoid 24 is energized and the pawls 16, 17 are therefore out of engagement with the teeth 8. The disc 5 is under these conditions rigidly coupled to and driven by a comparatively high speed motor, the armature of which has a correspondingly large amount of stored energy, while the disc 9 is rigidly coupled to a worm having a comparatively small amount of stored energy, the discs 5 and 9 being rigidly coupled through the medium of the discs 11, 7, and 12, which are pressed together by means of the spring 13.

Assuming that the motor and solenoid circuits are opened simultaneously, the pawls 16, 17 will move in towards the teeth 8 under the influence of the spring 20, and the disc 7 will be immediately stopped by one of the pawls, according to the direction of rotation, the other pawl riding idly over the teeth 8. The motor and the disc 5 will continue to revolve until their stored energy is exhausted in friction, the amount of rotation depending on the speed at the instant of stopping the pressure of the spring and the condition of the friction surfaces. The worm, together with the disc 9, may also continue to rotate, but it is obvious that even if it continues to rotate at all, the amount will be very small owing to the small inertia of the worm, the load on the worm, the friction on the disc 9, and the friction between the worm and the teeth on the worm wheel.

It has been assumed in the foregoing description that 1 is the driving shaft, but it is obvious that it will act equally well as the driven shaft.

The discs 11, 7, 12 may be readily removed for renewal by forcing the disc 9 to the right against the pressure of the spring 13, the disc 9 being moved far enough to allow the disc 7 to be removed through the space between the ends of the shafts 1, 2. The discs 11, 12 may then be similarly removed.

If it is desired that no wear shall take place on the inner faces of the discs 5, 9, provision may be made to prevent relative movement between the discs 5 and 11, and also between the discs 9 and 12. This may be accomplished by a suitable adhesive, by suitable projections and corresponding recesses, by a pin or pins secured to one part and projecting into the other, or by any other suitable means.

Instead of employing the pawls 16, 17 for stopping the disc 7, a band-brake may be employed, as shown in Fig. 5, in which 25 is a disc similar to the disc 7 but with a plain cylindrical outer surface, and 26, 27 are brake blocks attached to brake bands 28, 29 respectively. The armature 30 of a solenoid 31 operates a lever 32 pivotally mounted at 33. A spring 34 operates the lever 32 to bring the brake-blocks 26, 27 into contact with the disc 25.

While only one particular application of the device has been described, it is obvious that it may be employed for other kinds of drive.

It is also to be understood that various modifications may be made without departing from the spirit of the invention.

For example, the friction discs 11, 12 may be omitted, and the discs 5 and 9, adapted to bear against the disc 7. Further, the two sets of teeth shown in Fig. 4 may be mounted on two separate discs, and may be employed with or without one or more friction discs 11, 12.

What I claim as new and desire to secure by Letters Patent of the United States, is,—

1. The combination with a driving element and a relatively movable driven element, of a movable member in frictional engagement with each of the said elements for normally transmitting the driving power therebetween, and means for arresting the movement of the said member to prevent the transmission of power to the driven element and stop the driven element.

2. The combination with a driving and a driven shaft, of clutch mechanism having a rotating member in frictional engagement with each of the said shafts for normally transmitting the driving torque therebetween, stop mechanism normally biased to engage the said member for arresting the rotation of the said driven shaft, and electromagnetic means for effecting the disengagement of the said mechanism to permit rotation of the said driven shaft.

3. The combination with a driving and a driven shaft, of clutch mechanism including a plurality of cooperating rotating members biased into frictional engagement for transmitting the normal driving torque between the said shafts, and means for arresting the rotation of an intermediate one of the said members to prevent the transmission of torque to the driven element.

4. The combination with a driving and a driven shaft disposed in axial alignment, of a plurality of cooperating discs biased into frictional engagement for normally transmitting the driving torque between the said shafts, one of the said discs being rotatably supported on one of the said shafts and having teeth on the periphery and recesses in the sides thereof, others of said discs being secured to the said shafts for rotation therewith, and the remainder of said discs being rotatably supported in the said recesses intermediate the said one disc and the others, and stop mechanism operable into engagement with the said teeth on the said one disc for preventing rotation thereof.

In witness whereof, I have hereunto set my hand this second day of January, 1924.

EDWARD BROWNE TUPPEN.